Aug. 13, 1935.  L. W. SHIELDS  2,011,122
SHAKER TOP
Filed Aug. 7, 1934  2 Sheets-Sheet 1
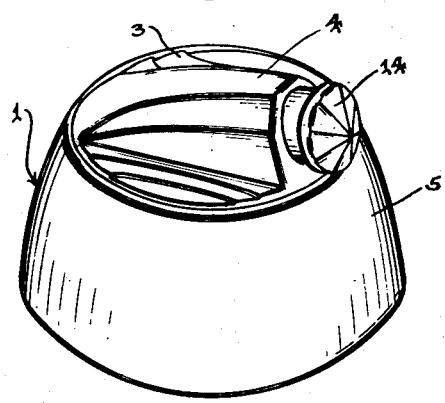
Fig. 1.
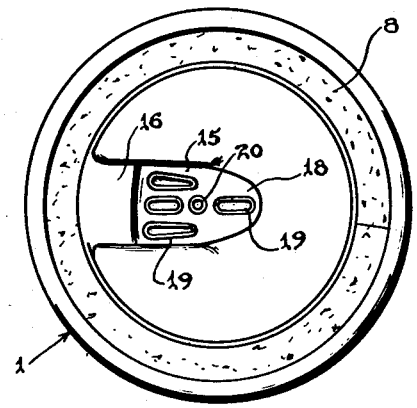
Fig. 2.
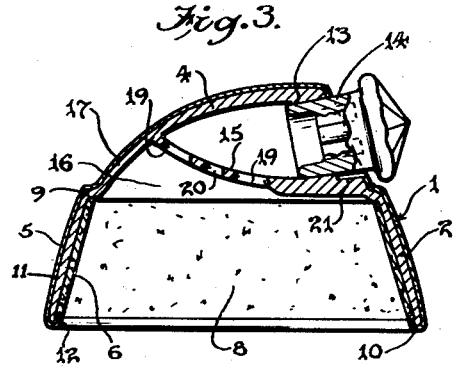
Fig. 3.
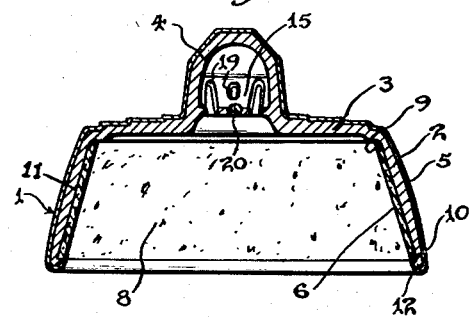
Fig. 4.
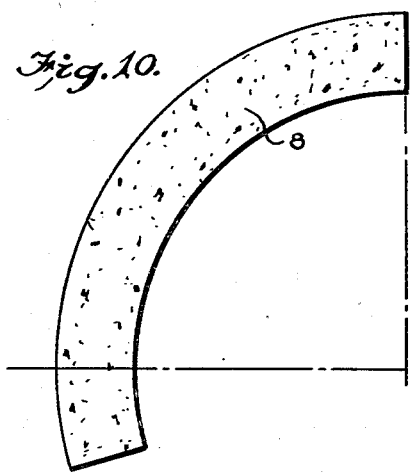
Fig. 10.
Inventor
Lowell W. Shields,
By
Attorney Aug. 13, 1935.  L. W. SHIELDS  2,011,122
SHAKER TOP
Filed Aug. 7, 1934   2 Sheets-Sheet 2
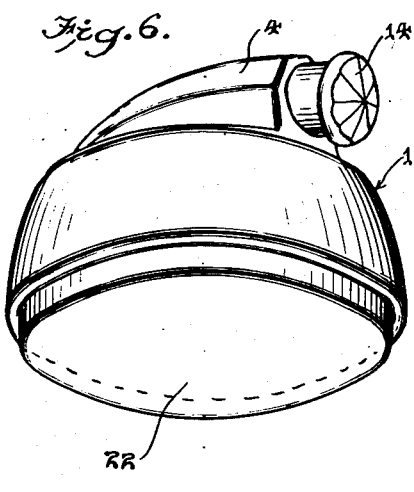
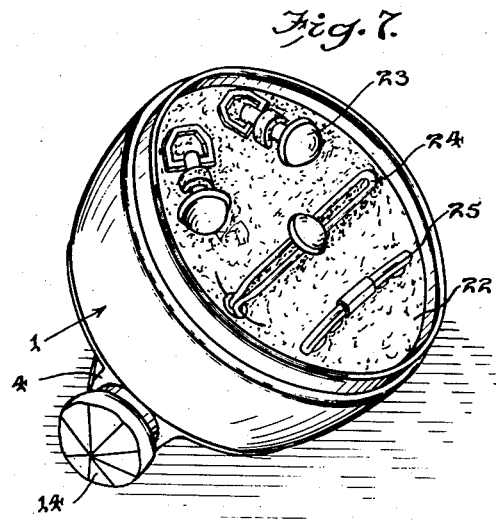
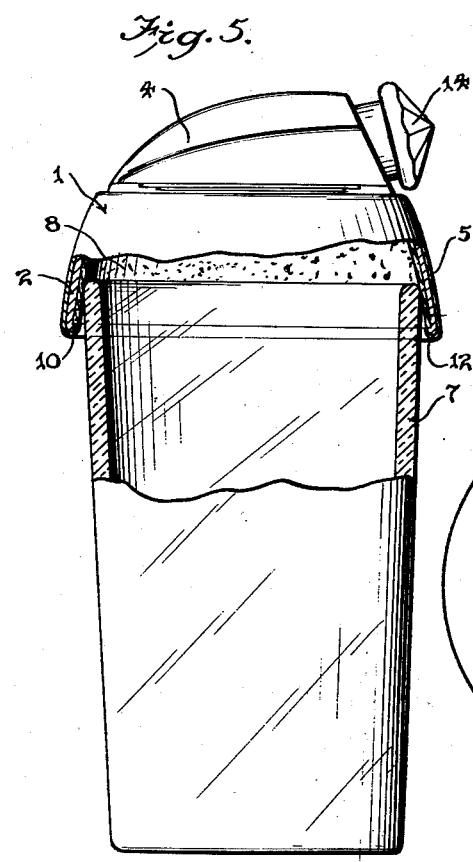
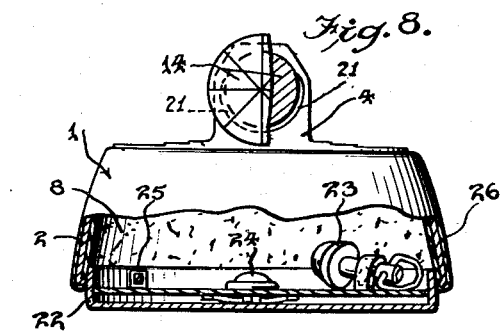
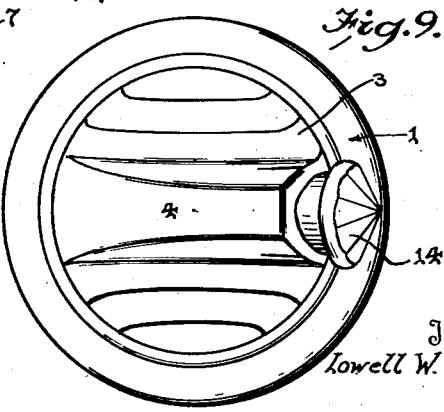
Inventor
Lowell W. Shields,
By
Attorney Patented Aug. 13, 1935

2,011,122

UNITED STATES PATENT OFFICE 2,011,122

SHAKER TOP

Lowell W. Shields, Rochester, N. Y., assignor to Hickok Manufacturing Company, Inc., Rochester, N. Y., a corporation of New York Application August 7, 1934, Serial No. 738,848

11 Claims. (Cl. 210—163)

The invention relates to a shaker top.

The object of the present invention is to provide a simple, practical and efficient shaker top of strong, durable and comparatively inexpensive construction adapted to be readily applied to a drinking glass or similar receptacle and capable of fitting the tops of glasses of different diameters and of forming a liquid-tight connection with the same to enable beverages to be mixed in the usual manner by shaking without liability of any of the liquid leaking at the upper edge of the glass or other receptacle where the shaker top is applied to the same.

A further object of the invention is to provide a shaker top of this character equipped with a compactly arranged pouring spout having a strainer adapted to enable clear liquid to be poured from the shaker top through the pouring spout without liability of the same being clogged by seeds, pulp, etc. which may be a part of the mixture or result from the shaking operation.

Another object of the invention is to provide a shaker top adapted to be die cast in one piece and thereby obviate the inconvenience incident to assembling pieces by soldering methods to produce such parts as the spout of the shaker top.

It is also an object of the invention to provide a shaker top having a pouring spout disposed across the top of the shaker top and adapted to receive a stopper for closing the passage of the spout when the shaker top is in use for shaking or mixing a beverage.

Another object of the invention is to provide a shaker top adapted to constitute the top of a container for packaging jewelry items, belts, buckles and other articles of merchandise with the container reversible so as to face either inward or outward in order that the merchandise may be located either within the package or exteriorly of the same for displaying the article or articles to be sold.

With these and other objects in view, the invention consists in the construction and novel combination and arrangement of parts hereinafter fully described, illustrated in the accompanying drawings and pointed out in the claims hereto appended, it being understood that various changes in the form, proportions and minor details of construction may be resorted to without departing from the spirit or sacrificing any of the advantages of the invention.

In the drawings:

Figure 1 is a perspective view of a shaker top constructed in accordance with this invention.

Figure 2 is a reverse plan view of the same.

Figure 3 is a central vertical sectional view of the shaker top taken longitudinally of the pouring spout.

Figure 4 is a vertical sectional view taken transversely of the pouring spout.

Figure 5 is a side elevation partly in section showing the shaker top applied to a drinking glass.

Figure 6 is a perspective view showing the shaker top applied to and forming the top or cover of a container for merchandise with the container facing inwardly.

Figure 7 is a similar view of the shaker top with the container facing outwardly to display its contents.

Figure 8 is a side elevation partly in section showing the shaker top applied to a container such as illustrated in Figure 6.

Figure 9 is a plan view of the shaker top.

Figure 10 is a plan view of the arcuate cork lining strip.

In the accompanying drawings in which is illustrated the preferred embodiment of the invention, the shaker top 1 is die cast in a single piece and is designed to be constructed of aluminum or any other suitable material and it consists of an upwardly and inwardly-inclined circular side wall 2 and a horizontal top wall 3 which is provided with a transversely disposed integral pouring spout 4 extending across the top wall and lying wholly within the area of the said top wall as clearly illustrated in Figures 1 and 9 of the drawings. The circular inwardly-inclined side wall 2 preferably presents an outer face 5 which is curved from the top wall 3 to the lower edge of the side wall 2 and the latter has an inner face 6 which is preferably conical or straight from the top wall 3 to the lower edge of the side wall 2, viewed sectionally, and is adapted to fit over the upper edge of a drinking glass 7 or similar receptacle. The drinking glass or receptacle 7 constitutes the body portion of the shaker and the shaker top is adapted to be applied to various sizes and kinds of drinking glasses or analogous receptacles.

In order to enable the shaker top to fit tightly over glasses or receptacles of different diameters and make a liquid-tight fit so that the glass and the shaker top may be used as a shaker for mixing beverages without liability of any of the liquid escaping at the joint or connection between the shaker top and the body portion of the shaker, the shaker top is provided at the inner face of its side wall 2 with a yieldable or elastic lining 8 of cork or other suitable material. The cork lining 8 which is relatively thin and which is preferably cut in arcuate form as illustrated in Figure 10 of the drawings is securely held in place on the inner face of the side wall 2 between an upper shoulder 9 and a lower shoulder 10 by adhesive material. The upper shoulder 9 is formed by insetting the side wall 2 as shown to form an exterior annular recess 11 and the said shoulder 9. The lower shoulder 10 is formed by a lip or flange 12 which is preferably rounded at the lower face to form a rounded lower edge for the side wall 2.

The pouring spout which extends entirely across the top wall 3 of the shaker top substantially diametrically thereof is provided with a substantially cylindrical passage 13 for the reception of a stopper 14 and the said pouring spout is provided at the inner end of the passage 13 with a substantially inclined strainer 15 formed integral with the top wall 3 of the shaker top and with the pouring spout. The strainer and rear portion of the pouring spout form a recess 16 in the top wall 3 of the shaker top and the said recess has side walls integral with the strainer and with the said top wall 3 of the shaker top and with the rear inclined portion 17 of the pouring spout. The strainer 15 has a tapered inner portion 18 which merges into and is connected with the top 3 as fully illustrated in Figure 2 of the drawings. The strainer openings are preferably formed by slots 19 and an aperture 20 but the strainer openings may be of any form and number as will be readily understood.

The substantially cylindrical passage 13 of the pouring spout has a slight taper and the stopper 14 has a corresponding taper and is preferably constructed of aluminum or other suitable metal. Also, the outer end of the passage 13 is preferably enlarged at the bottom and sides at 21 to facilitate positioning of the tapered inner portion of the substantially cylindrical stopper in the passage 13. The taper of the inner portion of the stopper is shown particularly in Fig. 3 and it has relatively tight fit with the slightly tapered outer end of the pouring spout inwardly of said enlarged outer end 21 of the pouring spout as illustrated in Fig. 3.

The shaker top may also be advantageously employed as a cover for a container 22 for packing jewelry items 23, 24 and 25, belts and buckles and other articles of merchandise. The container 22 is of circular form with substantially cylindrical side walls and is adapted to be arranged facing inwardly with respect to the shaker top as illustrated in Figure 6 of the drawings or facing outwardly as illustrated in Figure 7 of the drawings. When the container is arranged in the shaker top facing outwardly as shown in Figure 7, the shaker top forms a support for the container for enabling the contents of the same to be advantageously displayed. The pouring spout which extends across the top wall of the shaker top centrally of the same is adapted to cause a tilting of the shaker top as illustrated in Figure 7 of the drawings, so that the container and its contents will be displayed with easel effect.

The die-cast one-piece shaker top may be finished by polishing the surfaces of the metal of the shaker top or the exterior surfaces of the shaker top may have an enamel covering 26 or other ornamental coating. The constructing of the shaker top in a single piece by die casting or other means obviates the inconvenience and expense of the employment of soldering methods in assembling parts and at the same time provides a more sturdy construction and insures a longer life of the shaker top.

The shaker top is adapted to serve as a cover for a container for items of jewelry and articles of merchandise and it is also capable of being readily applied to drinking glasses and analogous receptacles of different diameters to enable the same to form the body portion of a shaker for mixing beverages. It will also be clear that a liquid-tight joint is effected between the shaker top and the body of the shaker to effectively prevent any of the liquid from escaping during the shaking operation and after the shaking operation has been completed the liquid may be poured off clear without liability of the pouring spout becoming clogged with pulp, seeds and the like. Also the shaker top may be used with the body portion of a shaker of any character of a size that will fit within the shaker top.

What is claimed is:

1. A shaker top forming a cap for a vessel for containing beverages to be mixed by shaking, said shaker top being provided with a transversely disposed narrow, hollow projecting portion constituting a closed top pouring spout located within the contour of the shaker top and at its inner end communicating with the interior of the shaker top at one side thereof and at its outer end opening outwardly adjacent the opposite side of the shaker top.

2. A shaker top adapted to form a cap for a drinking glass or other vessel and provided with an integral narrow, hollow transversely disposed pouring spout closed at its top and sides and open at the outer end and communicating at its inner end with the interior of the shaker top and provided with a strainer arranged to permit clear liquid to be poured from the shaker top and prevent the spout from becoming clogged with pulp, seeds and the like.

3. A shaker top comprising an inwardly-inclined side wall adapted to permit the shaker top to be fitted on glasses and other receptacles of different diameters, a top wall, and a transversely disposed longitudinally tapered pouring spout located above and connected with and arranged within the area of the said top wall and extending entirely across the top wall and having a passage communicating at its inner portion with the interior of the shaker top and provided thereat with a strainer to permit clear liquid to be poured from the shaker top and to prevent the spout from becoming clogged with seeds, pulp and the like.

4. A shaker top comprising a side wall, a top wall and an approximately horizontal pouring spout extending across the top wall and having a passage communicating with the interior of the shaker top and provided at the inner portion thereof with an inclined strainer extending across the passage of the pouring spout and adapted to permit clear liquid to be poured through the same and prevent the spout from becoming clogged with pulp, seeds and the like, said spout and strainer forming a tapering recess extending upwardly from the top wall.

5. A shaker top comprising a side wall, an approximately horizontal top wall and a transversely disposed pouring spout extending across the top wall and tapered at its rear portion and provided at the tapered portion with an inclined strainer extending across the passage of the spout to permit clear liquid to be poured from the spout and prevent the spout from becoming clogged, said strainer and the rear portion of the spout forming a recess extending upwardly above the top wall of the shaker top.

6. A shaker top having an inwardly-inclined side wall and a top wall and provided at the top wall with a transversely disposed pouring spout located within the area of the top wall and communicating with the interior of the shaker top, and a relatively thin elastic lining arranged at the inner face of the side wall of the shaker top and adapted to form a liquid-tight joint when the shaker top is placed on a drinking glass or other vessel.

7. A shaker top comprising an upwardly and inwardly-inclined side wall, a top wall, said side wall being provided adjacent the top wall with an interiorly arranged shoulder and having an interiorly projecting flange at its lower edge forming a lower shoulder, a relatively thin lining of elastic material arranged at the inner face of the side wall and located between the said upper and lower shoulders, and a transversely disposed pouring spout located at the top wall of said upper portion and arranged approximately diametrically of the shaker top and communicating with the interior of the latter.

8. A shaker top comprising a side wall, a top wall and a relatively long, narrow transversely disposed pouring spout extending across the top wall and arranged approximately diametrically of the shaker top and communicating with the interior of the same.

9. The combination of a shaker top comprising a side wall, a top wall and a transversely disposed pouring spout extending across the top wall and arranged approximately diametrically of the shaker top and communicating with the interior of the same, and a container fitting within the shaker top which forms a cover for the container, said container being reversible and adapted to be placed in the shaker top facing inwardly or outwardly.

10. The combination of a shaker top comprising a side wall, a top wall and a transversely disposed pouring spout extending across the top wall and arranged approximately diametrically of the shaker top and communicating with the interior of the same, and a container fitting within the shaker top which forms a cover for the container, said container being reversible and adapted to be placed in the shaker top facing inwardly or outwardly, and the said spout being arranged to support the shaker top in a tilted or inclined position when the container is faced outwardly for displaying its contents.

11. A shaker top including a top wall and a transversely disposed pouring spout integral with said top wall and arranged approximately diametrically of said top wall and opening outwardly adjacent the edge of the latter.

LOWELL W. SHIELDS.